UNITED STATES PATENT OFFICE.

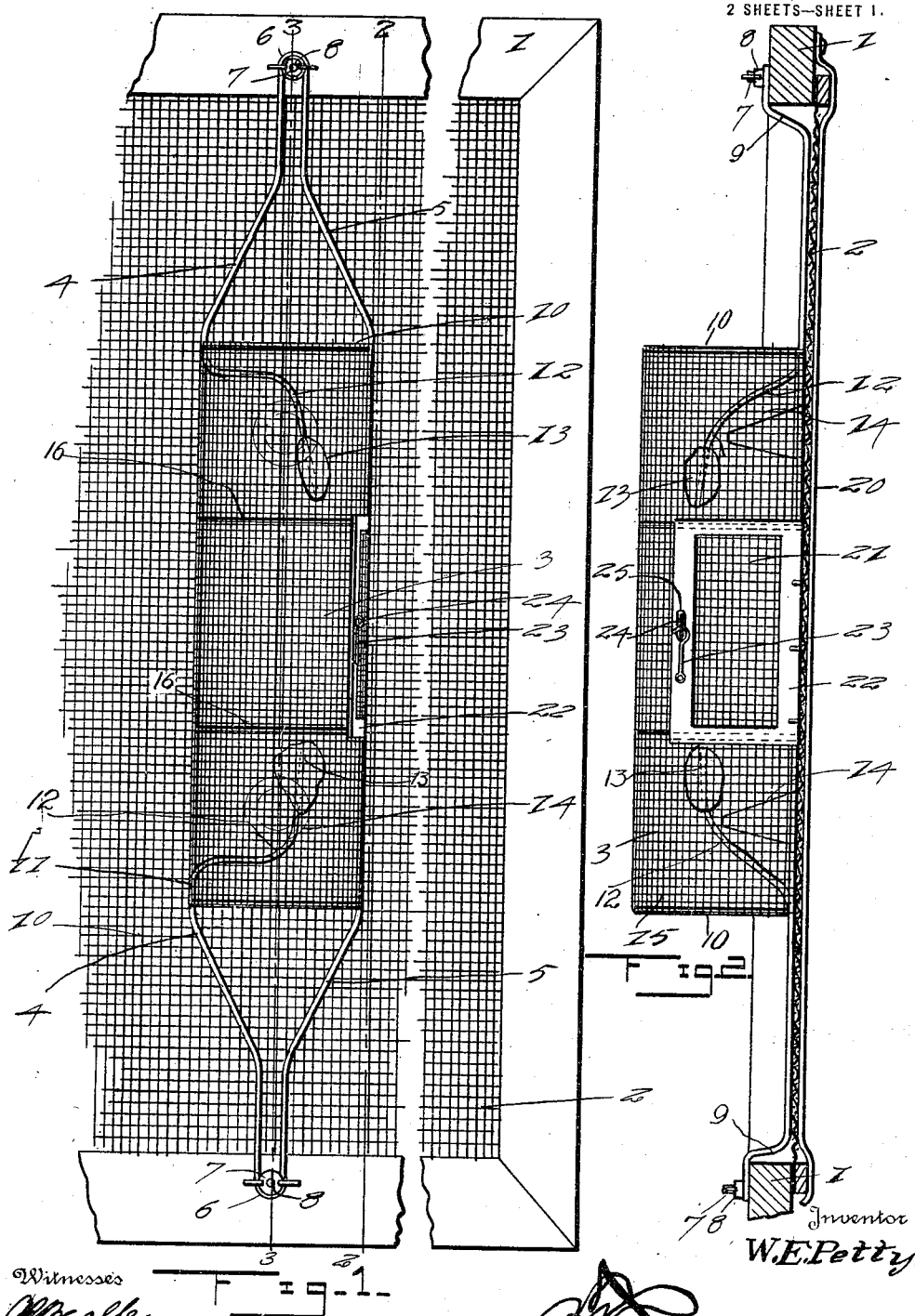

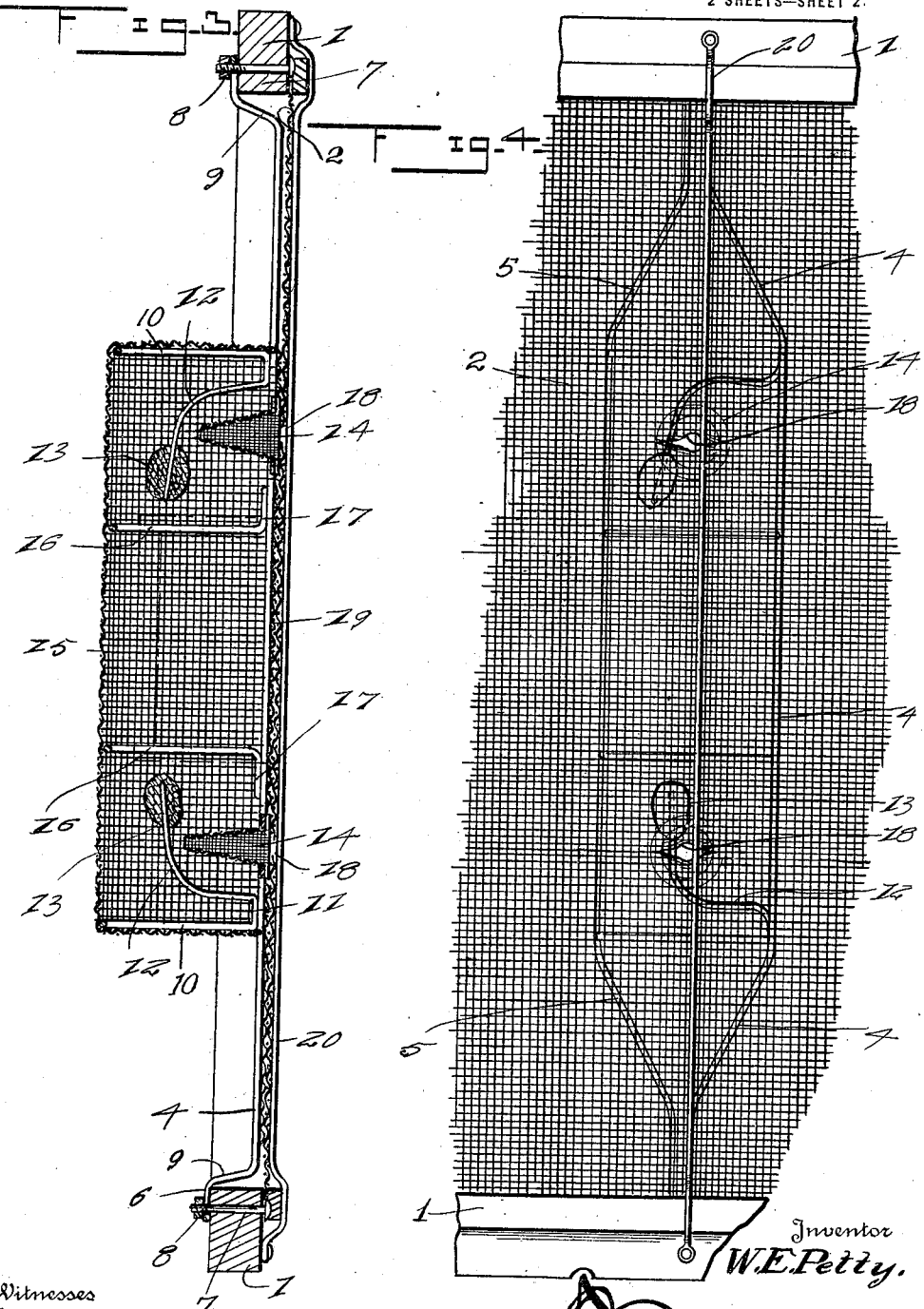

WILLIAM E. PETTY, OF STORM LAKE, IOWA.

FLY-TRAP.

1,297,728.  Specification of Letters Patent.  Patented Mar. 18, 1919.

Application filed August 14, 1918. Serial No. 249,872.

*To all whom it may concern:*

Be it known that I, WILLIAM E. PETTY, a citizen of the United States, residing at Storm Lake, in the county of Buena Vista and State of Iowa, have invented certain new and useful Improvements in Fly-Traps; and I do hereby declare the following to be a full, clear, and exact description of the invention, such as will enable others skilled in the art to which it appertains to make and use the same.

This invention relates to fly traps, and the primary object of the invention is to provide a fly trap which is adapted for detachable connection to screen doors, window screens or the like, for the purpose of catching flies which congregate on the outer surface of the screen for entrance into the house, when the door is opened.

Another object of this invention is to provide a supporting structure for the trap, which is constructed of a strand of wire bent to form the sides of the base of the trap, and also to form loops which are attached through the medium of wing nuts to the frame of the screen for detachably connecting the trap to the screen.

A further object of this invention is to provide a strand of resilient wire which is attached to the frame of the screen on the opposite side from the trap structure and is provided for holding the screen in engagement with the bottom of the trap, so as to prevent flies from passing between the screen of the door and the bottom of the trap when they enter through openings formed in the door screen.

With the foregoing and other objects in view, this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a face view of the trap showing the same applied to a part of a screen door;

Fig. 2 is a section on the line 2—2 of Fig. 1 showing the trap structure in side elevation;

Fig. 3 is a longitudinal section on the line 3—3 of Fig. 1; and

Fig. 4 is a face view of the screen looking at the bottom of the trap structure and in the direction opposite to the direction from which Fig. 1 is taken.

Referring more particularly to the drawings, 1 designates the frame of the screen door or window screen, and 2 designates the wire mesh of the screen. The trap structure, which is generally indicated by the numeral 3, comprises a main body which is of substantial semi-cylindrical shape, being constructed of wire mesh similar to the wire mesh of which the screen is formed. The base or bottom of the trap structure is constructed of mesh wire and is braced and supported by a pair of longitudinally extending wires 4 and 5 which extend along each side of the bottom of the trap as clearly shown in Fig. 4 of the drawings. The wires 4 and 5, extend beyond the ends of the trap, and are bent toward each other so as to position their outermost portions in close relation to each other with respect to the portion thereof which form braces for the sides of the base of the trap. The ends of the rods or wires 4 and 5 are connected by loops, which loops extend about bolts 7. The bolts 7 extend through the frame 1 of the screen as clearly shown in Fig. 3 of the drawings, and the loops 6 are held about the bolts and in firm engagement with the surfaces of the frame by wing nuts 8 which are removably mounted upon the bolts 7, so that when it is desired, the trap may be disconnected from the screen by the removal of the wing nuts 8 from the bolts 7. The wires or rods 4 and 5 are bent outwardly, as shown at 9, in Fig. 3 of the drawings, so as to properly position the loops 6 for engagement with the surface of the frame 1.

The end frame of the trap is formed of rods or wires 10 which extend at right angles to the wires 4 and 5. Each of the rods or wires 10 have one of their ends secured to the rod 5 and they are bent as shown at 11 for extending parallel with the rod 4, being secured thereto in any suitable manner. The wires 10 are bent upwardly and inwardly toward each other from their portions 11, so as to provide bait sponge supporting arms 12 upon the inner ends of which are mounted bait sponges 13 which are moistened by a sweetened liquid. The sponges 13 are positioned inwardly within the trap from the substantially frusto-conical guards or caps 14 which are constructed of screen wire and have their apexes positioned within the trap. The caps or guards 14 extend inwardly about openings formed in the base of the trap for guiding flies inwardly into the interior of the trap. The body of the trap which is indicated by the numeral 15, is braced by suitable substantially U-shaped braces 16 which have their bases bent angularly as shown at 17 and secured in any suitable manner to the rods 4 and 5. The screen 2, is provided with openings 18 formed therein which aline with the openings formed in the bottom 19 of the trap, so that flies may pass through the screen and the conical guards or caps 14 into the interior of trap from the outside of the room.

A rod 20 which is preferably constructed of resilient wire is attached to the frame 1 upon the outside of the screen or upon the side oppositely from the side to which the rods 4 and 5 are connected, as clearly shown in Figs. 3 and 4 of the drawings. The rod 20 is provided for holding the screen wire 2 in engagement with the screen wire of which the bottom 19 of the trap is formed for preventing the flies from passing between the screen of the door and the bottom of the trap after they have passed through the openings 18.

The rod 20 may also be used for shaking the screen for causing all of the flies which might be adhering thereto to fly from the screen and the flies which might be within the conical guides 14 to enter the trap, before the trap is removed, by snapping the wire, or drawing it outwardly, so that its resiliency will cause it to spring back against the outer surface of the screen 2.

The trap body 15 has a door 21 carried thereby which is hingedly connected to the trap body and is provided for permitting the emptying of the flies or insects from the trap. The door 21 has its edges bound by suitable material as indicated at 22 and it has a hook 23 carried thereby which is adapted for insertion through a staple 24 which projects through an opening 25 formed along one free edge of the door 21, as clearly shown in Fig. 2 of the drawings, this staple being secured to the body of the trap in any suitable or preferred manner. The hook 23 is provided for holding the door in a closed position.

In reducing the invention to practice, certain minor features of construction, combination and arrangement of parts may necessitate alterations to which the patentee is entitled, provided such alterations are comprehended within the scope of what is claimed.

What is claimed is:—

1. In a trap structure, the combination with a screen door including a frame, of a pair of rods having their ends connected and shaped to form loops, bolts carried by the door frame, wing nuts mounted upon said bolts and engaging said loops for attaching said wires to the screen frame, a plurality of substantially U-shaped rods connected to said first named rods and forming braces for the body of said trap, transversely extending rods connected to said first named rods at the ends of the trap structure, said last named rods being bent inwardly and outwardly for extending into the body of the trap for forming bait sponge supporting arms.

2. In a trap structure, the combination with a screen door including a frame, of a pair of rods having their ends connected and shaped to form loops, bolts carried by the door frame, wing nuts mounted upon said bolts and engaging said loops for attaching said wires to the screen frame, a plurality of substantially U-shaped rods connected to said first named rods and forming braces for the body of said trap, transversely extending rods connected to said first named rods at the ends of the trap structure, said last named rods being bent for extending into the body of the trap for forming bait sponge supporting arms, the screen of the door being provided with openings, openings formed in the bottom of the trap structure, substantially frusto-conical guides extending into the trap structure for guiding insects from said openings into the trap.

3. In a trap structure, the combination with a screen door including a frame, of a pair of rods having their ends connected and shaped to form loops, bolts carried by the door frame, wing nuts mounted upon said bolts and engaging said loops for attaching said wires to the screen frame, a plurality of substantially U-shaped rods connected to said first named rods and forming braces for the body of said trap, transversely extending rods connected to said first named rods at the ends of the trap structure, said last named rods being bent inwardly and outwardly for extending into the body of the trap for forming bait sponge supporting arms, the screen of the door being provided with openings, openings formed in the bottom of the trap structure, substantially frusto-conical guides extending into the trap structure for guiding insects from said openings into the trap, a resilient rod attached to the side of the door screen oppositely to the side upon which the trap is positioned for holding the screen of the door in engagement with the outer surface of the base of the trap.

In testimony whereof I affix my signature in presence of two witnesses.

WILLIAM E. PETTY.

Witnesses:
JOHN R. CONNELL,
R. E. SHEFFIELD.

Copies of this patent may be obtained for five cents each, by addressing the "Commissioner of Patents, Washington, D. C."